(12) United States Patent
Chen

(10) Patent No.: US 8,908,388 B2
(45) Date of Patent: Dec. 9, 2014

(54) MOTHERBOARD SLIDING MECHANISM

(75) Inventor: Yi Chen, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 211 days.

(21) Appl. No.: 13/426,917

(22) Filed: Mar. 22, 2012

(65) Prior Publication Data

US 2013/0039023 A1   Feb. 14, 2013

(30) Foreign Application Priority Data

Aug. 9, 2011   (CN) .......................... 2011 1 0226587

(51) Int. Cl.
*H05K 7/14* (2006.01)
*H05K 7/18* (2006.01)
*A47G 19/08* (2006.01)
*G06F 1/18* (2006.01)

(52) U.S. Cl.
CPC ...................................... *G06F 1/184* (2013.01)
USPC ........................................ 361/802; 211/41.17

(58) Field of Classification Search
USPC ............... 174/50, 520, 561, 562; 361/679.02, 361/652, 727, 732, 740, 741, 756, 809
See application file for complete search history.

(56) References Cited

U.S. PATENT DOCUMENTS

| | | | | |
|---|---|---|---|---|
| 4,614,389 A * | 9/1986 | Albert et al. | .................. | 439/144 |
| 6,171,120 B1 * | 1/2001 | Bolich et al. | .................. | 439/157 |
| 6,556,436 B2 * | 4/2003 | Ohnishi | .................. | 361/679.43 |
| 6,606,255 B2 * | 8/2003 | Barringer et al. | ............. | 361/807 |
| 6,667,890 B1 * | 12/2003 | Barringer et al. | ............. | 361/752 |
| 6,816,383 B2 * | 11/2004 | Barringer et al. | ............. | 361/759 |
| 6,964,581 B2 * | 11/2005 | Chen et al. | ..................... | 439/547 |
| 7,215,556 B2 * | 5/2007 | Wrycraft | ....................... | 361/802 |
| 7,364,447 B1 * | 4/2008 | Desrosiers et al. | ........... | 439/157 |
| 7,654,844 B1 * | 2/2010 | Wormsbecher et al. | ...... | 439/259 |
| 7,684,208 B2 * | 3/2010 | Okamoto et al. | ............. | 361/798 |
| 7,684,209 B2 * | 3/2010 | Roesner | ........................ | 361/798 |
| 7,684,210 B2 * | 3/2010 | Kosugi et al. | ................. | 361/801 |
| 8,427,843 B2 * | 4/2013 | Zhang et al. | .................. | 361/801 |
| 2005/0155781 A1 * | 7/2005 | Kao et al. | ........................ | 174/50 |
| 2009/0129002 A1 * | 5/2009 | Wu et al. | ..................... | 361/679.4 |
| 2009/0262507 A1 | 10/2009 | Fujikawa et al. | | |
| 2010/0048037 A1 * | 2/2010 | Wormsbecher et al. | ........ | 439/32 |
| 2010/0188831 A1 * | 7/2010 | Ortet | ............................ | 361/788 |

\* cited by examiner

*Primary Examiner* — Hoa C Nguyen
*Assistant Examiner* — Xanthia C Cunningham
(74) *Attorney, Agent, or Firm* — Novak Druce Connolly Bove + Quigg LLP

(57) ABSTRACT

A motherboard sliding mechanism adapted for removing a motherboard out from a housing of an electronic device includes a bracket, a connecting member, and a sliding assembly. The bracket includes a supporting board and a sidewall perpendicularly extending from an edge of the supporting board, the supporting board defines a guiding groove. The connecting member slidably passes through the guiding groove, and is capable of detachably fixing the bracket to the housing of the electronic device. The sliding assembly is rotatably assembled on the bracket and detachably connected to the connecting member. The sliding assembly is capable of being rotated to lock or unlock the connecting member to drive the connecting member lock or unlock with the bracket, and the motherboard sliding mechanism with the motherboard can be conveniently slid out of the housing of the electronic device or firmly fixed in the housing of the electronic device.

13 Claims, 6 Drawing Sheets

MOTHERBOARD SLIDING MECHANISM

BACKGROUND

1. Technical Field

The present disclosure relates to sliding mechanisms, particularly to a motherboard sliding mechanism adapted for an electronic device.

2. Description of Related Art

Many kinds of electronic devices, such as computers, servers and panel computers, have at least one motherboard. The motherboard may be fixed to the housing of the electronic device through a plurality of fixing members. However, as the space availability of the housing is small, it is inconvenient to assemble or disassemble the motherboard.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
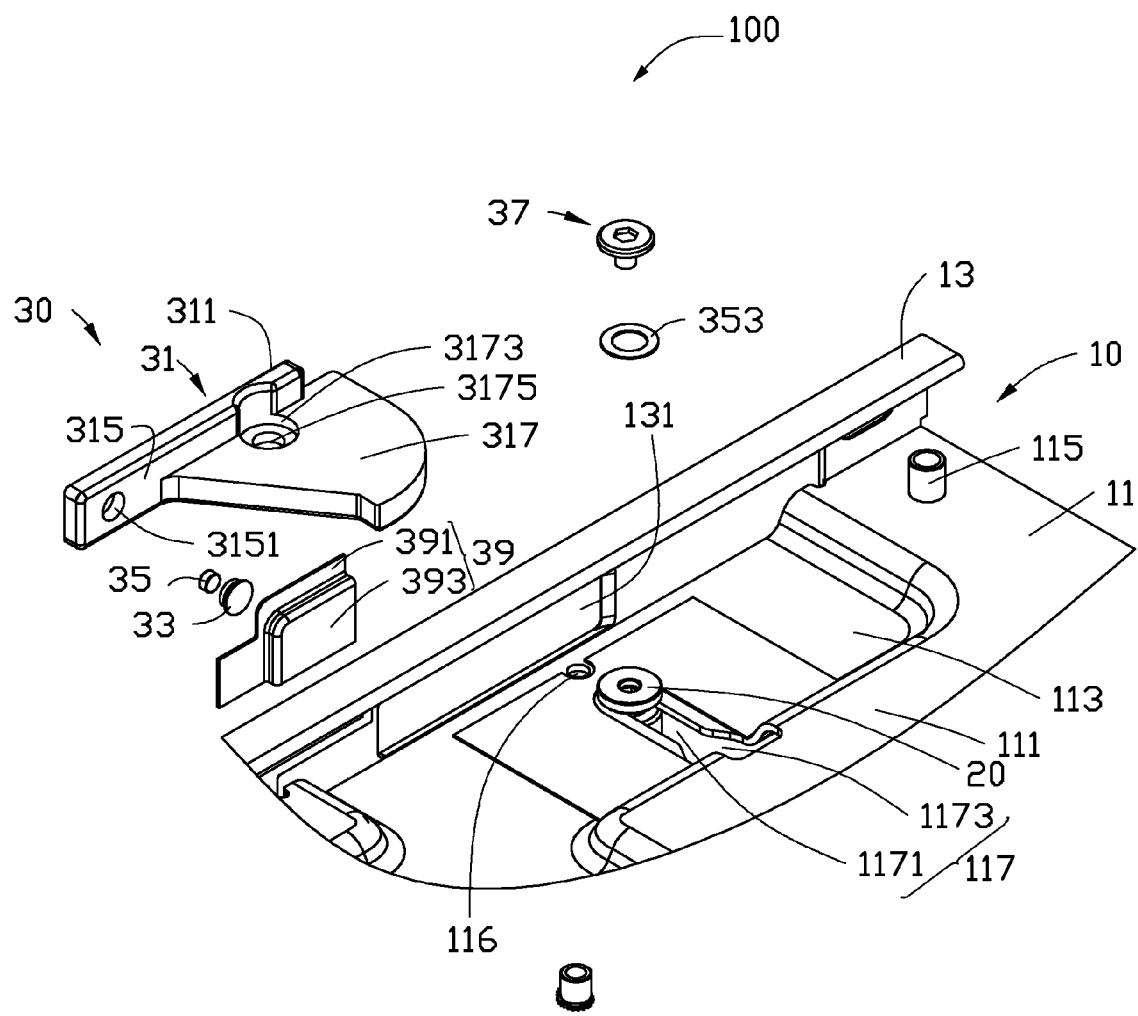
FIG. 1 is an exploded, isometric view of a part of an embodiment of a motherboard sliding mechanism.
Figure 2:
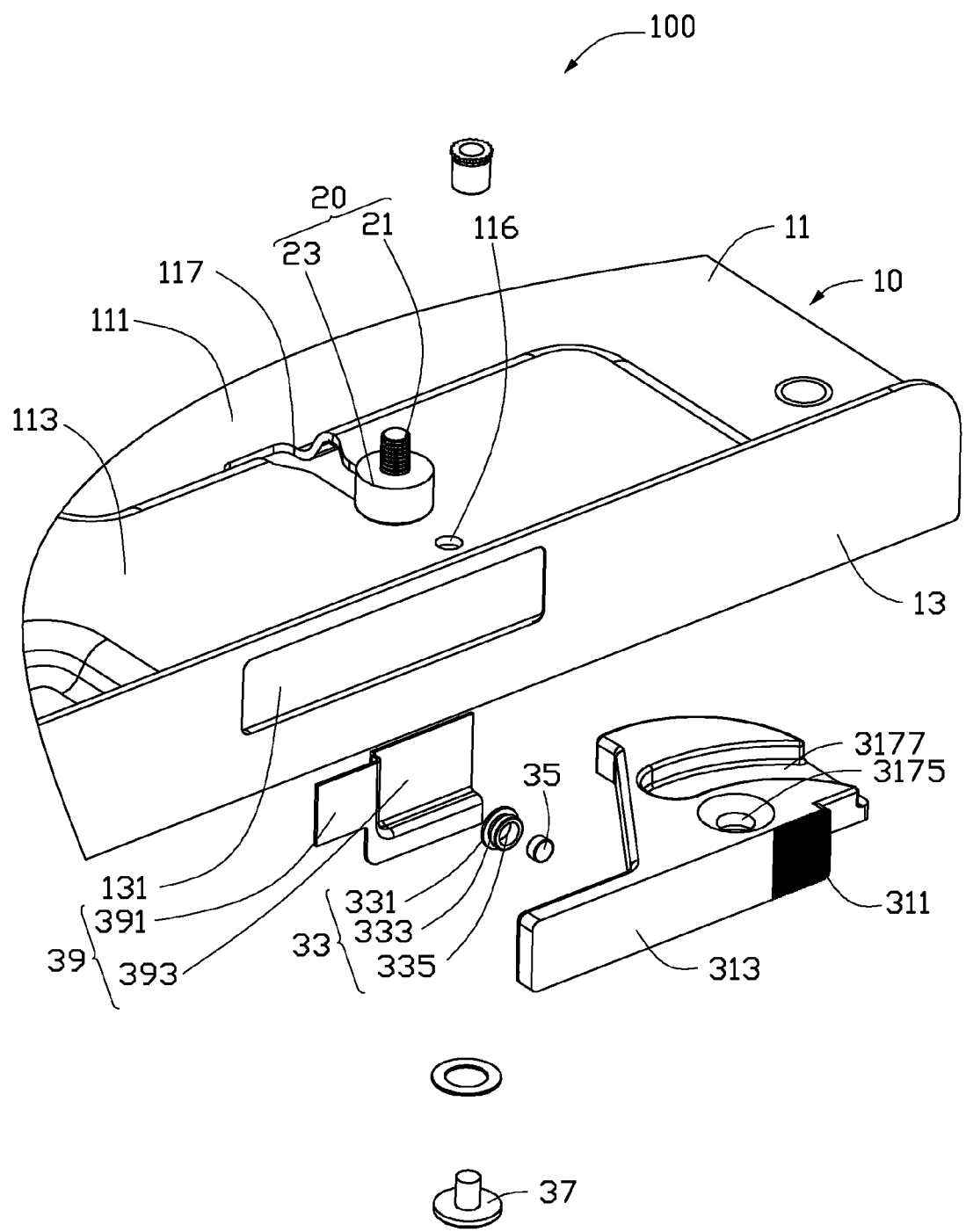
FIG. 2 is similar to FIG. 2, but viewed from another aspect.
Figure 3:
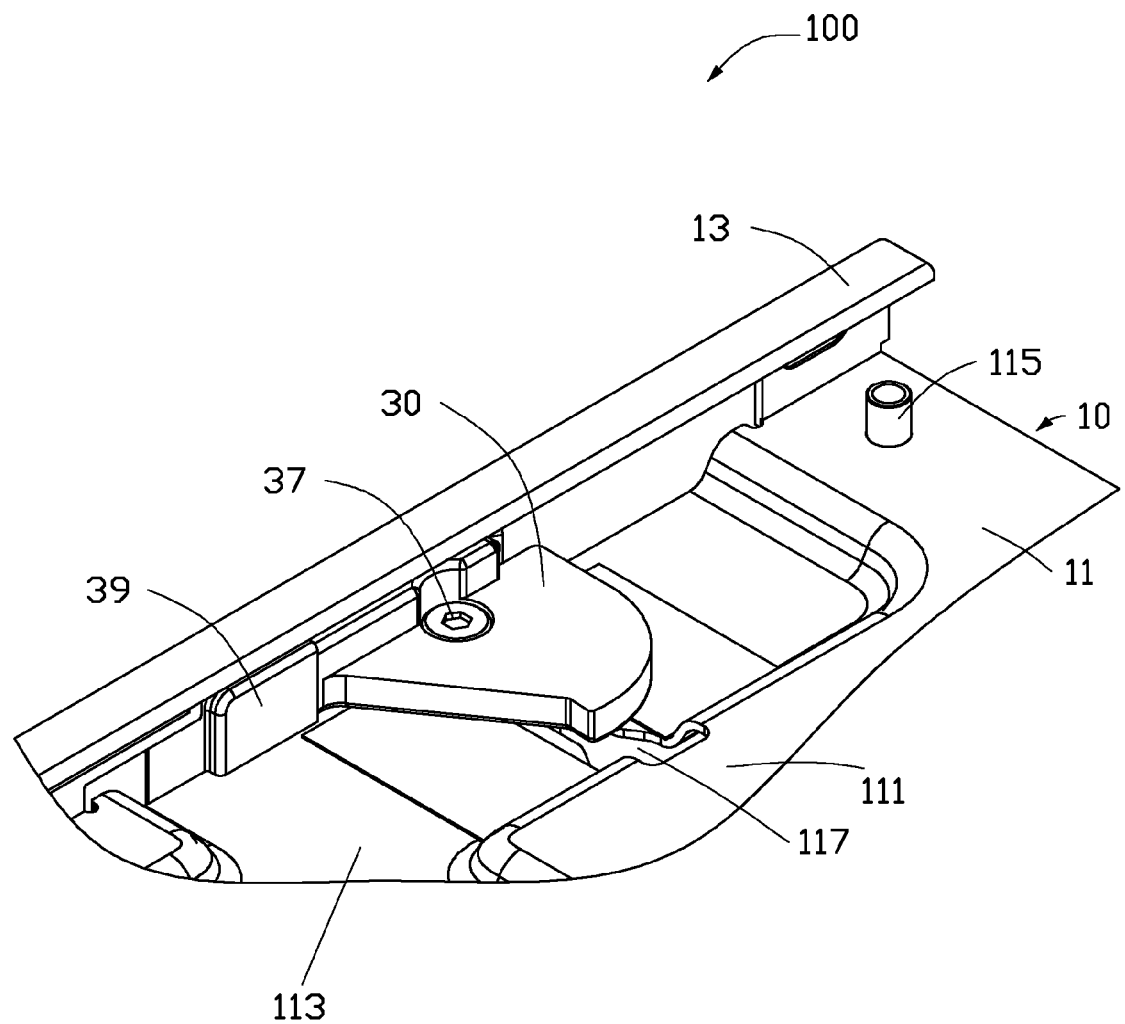
FIG. 3 is an isometric, assembled view of the motherboard sliding mechanism of FIG. 1.
Figure 4:
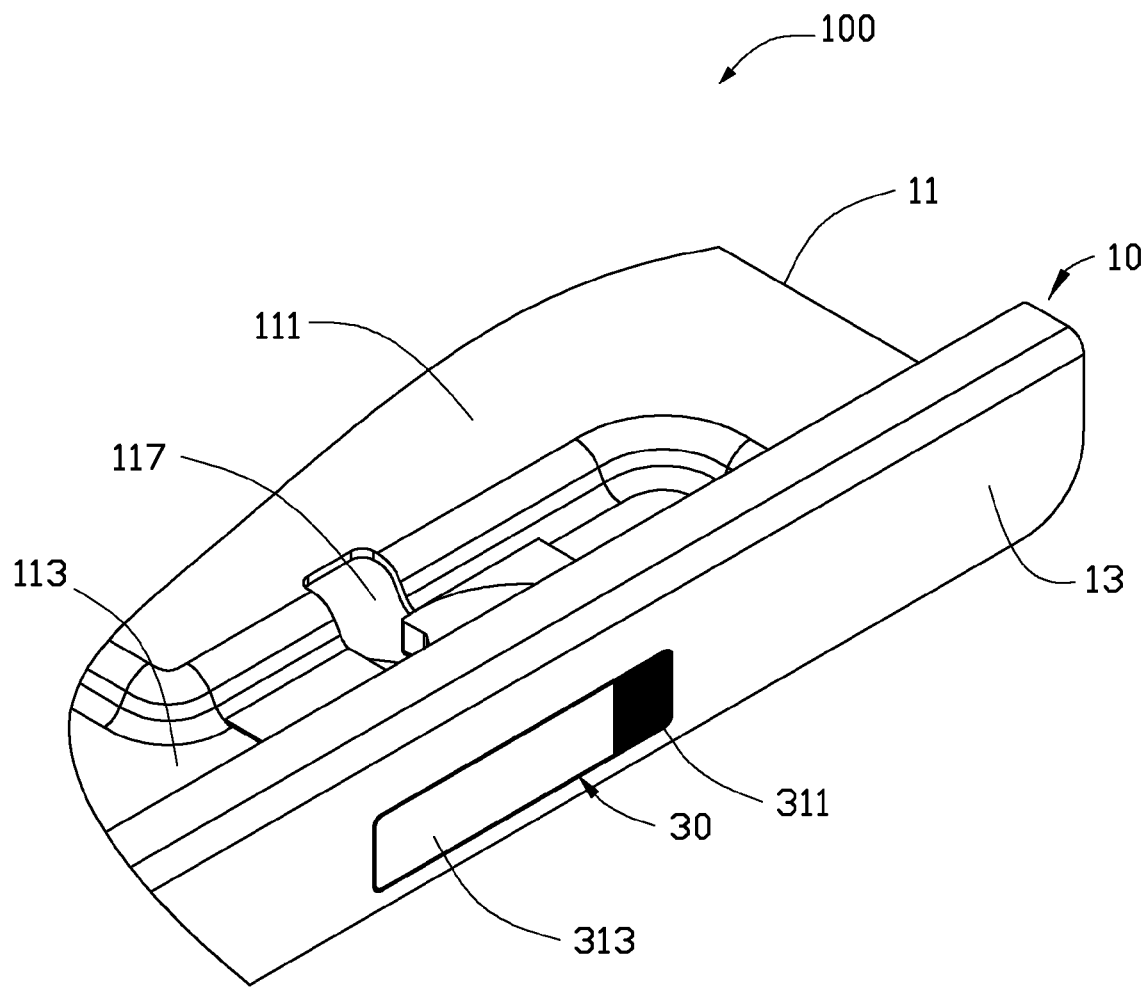
FIG. 4 is similar to FIG. 3, but viewed from another aspect.
Figure 5:
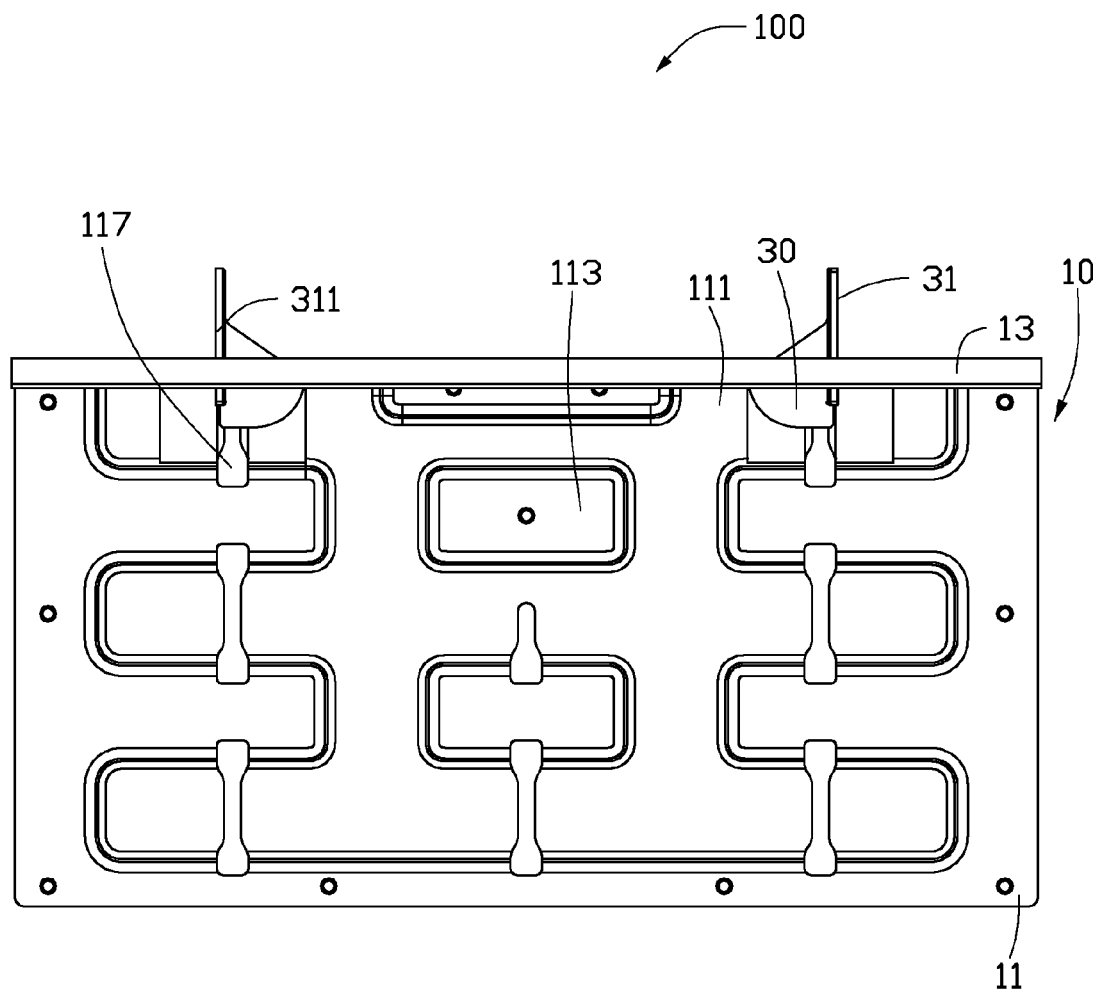
FIG. 5 is a top view of the motherboard sliding mechanism of FIG. 3 in use.

Referring to FIGS. 1 and 2, an embodiment of a motherboard sliding mechanism 100 includes a bracket 10, a connecting member 20 slidably and detachably connected to the bracket 10, and a sliding assembly 30 rotatably assembled on the bracket 10 and slidably and detachably connected to the connecting member 20. In the illustrated embodiment, the motherboard sliding mechanism 100 is used for a desktop computer.

Figure 6:
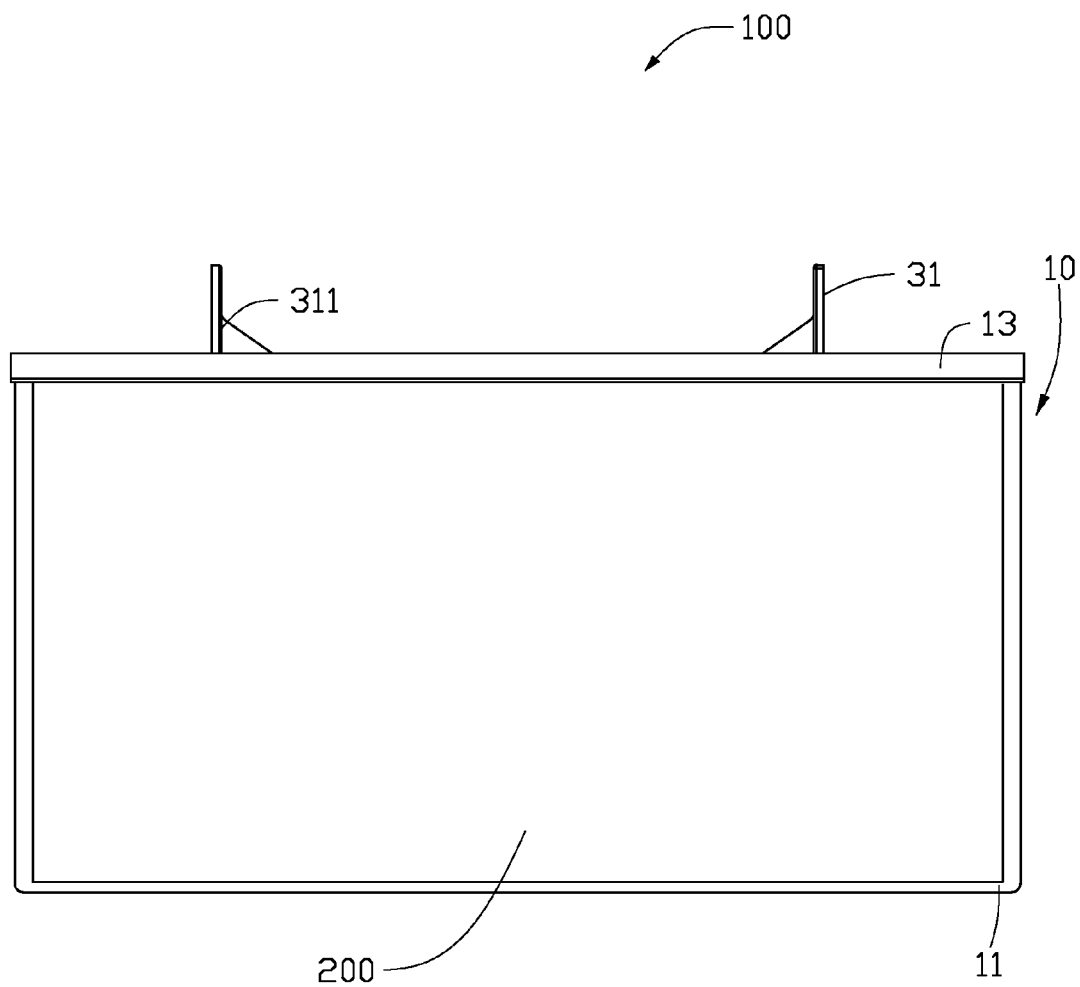
FIG. 6 is a top view of the motherboard sliding mechanism of FIG. 3 assembled with a motherboard in use.

The bracket 10 is a L-shaped board. The bracket 10 comprises a supporting board 11 and a sidewall 13 substantially perpendicularly extending from an edge of the supporting board 11. The supporting board 11 comprises a supporting surface 111 and a recessed portion 113 defined in the supporting surface 111 adjacent to the sidewall 13. The bottom of the recessed portion 113 defines a fixing hole 116 adjacent to the sidewall 13 and a guiding groove 117 adjacent to and apart from the fixing hole 116. In other words, the fixing hole 116 is between the sidewall 13 and the guiding groove 117. The guiding groove 117 is an L-shaped groove. The guiding groove 117 comprises a restricting groove 1171 and an unlocking groove 1173 communicating with the restricting groove 1171. In the illustrated embodiment, the unlocking groove 1173 is defined at an end of the restricting groove 1171 away from the sidewall 13 and substantially parallel to the sidewall 13. A diameter of the unlocking groove 1173 is bigger than that of the restricting groove 1171 to facilitate unlocking of the bracket 10 from the connecting member 20. The sidewall 13 defines a rectangular opening 131 adjacent to the fixing hole 116 for assembling the sliding assembly 30. The supporting board 11 further comprises a plurality of protrusions 115 mounted or formed on the supporting surface 111 to fix and support the motherboard 200 (shown in FIG. 6).

The connecting member 20 fixes the bracket 10 to the housing of an electronic device (not shown). The connecting member 20 comprises a fixing member 21 fixed to the housing of the electronic device and a shaft member 23 sleeved on the fixing member 21. In the illustrated embodiment, the fixing member 21 is a fastener, and the shaft member 23 is a hollow cylinder. The shaft member 23 slidably and detachably passes through the guiding groove 117 of the bracket 10.

The sliding assembly 30 comprises a sliding member 31, an assembling member 33, a magnetic member 35, a fastener 37, and a restricting member 39. The assembling member 33 is fixed to the sliding member 31. The magnetic member 35 is assembled on the sliding member 31 via the assembling member 33. The fastener 37 is used to rotatably fix the sliding assembly 30 to the bracket 10. The restricting member 39, fixed on the bracket 10, is used to attract the magnetic member 35.

The sliding member 31 comprises an operation portion 311 corresponding to the shape of the rectangular opening 131 to facilitate the installation of the sliding member 31 on the sidewall 13 of the bracket 10. The operation portion 311 comprises a pressing surface 313 and an assembling surface 315 opposite to the pressing surface 313. An end of the assembling surface 315 defines an assembling groove 3151 to receive the assembling member 33. The sliding member 31 further comprises a connecting portion 317 substantially perpendicularly extending from the assembling surface 315. In the illustrated embodiment, the connecting portion 317 is a fan-shaped board. The connecting portion 317 defines a rotating groove 3173 and a through hole 3175 at the center portion of the bottom of the rotating groove 3173. The connecting portion 317 further defines an arcuate sliding groove 3177 at a surface of the connecting portion 317 opposite to the rotating groove 3173. An end of the shaft member 23 of the connecting member 20 is slidably and detachably received in the rotating groove 3173.

The assembling member 33 comprises a base plate 331, a receiving portion 333 extending out from the center portion of the base plate 331, and a receiving groove 335 axially defined at an end of the receiving portion 333 away from the base plate 331.

In the illustrated embodiment, the shape of the magnetic member 35 corresponds to the shape of the receiving groove 335 of the assembling member 33, and the magnetic member 35 is fixed to the receiving portion 333 of the assembling member 33. The fastener 37 is a T-shaped bolt. The sliding member 31 is rotatably fixed to the bracket 10 via the fastener 37 passing through the through hole 3175 of the sliding member 31 and the fixing hole 116 of the bracket 10 with a cap (not shown) of the fastener 37 received in the rotating groove 3173.

The restricting member 39 comprises a base board 391 and a rectangular groove 393 defined at the base board 391. The restricting member 39 is fixed to the inner surface of the sidewall 13 by welding method, and the rectangular groove 393 covers an end of the rectangular opening 131. In the illustrated embodiment, the restricting member 39 is made of iron which can be attracted by the magnetic member 35. In an alternative embodiment, the restricting member 39 can be made of cobalt, nickel, or other metal materials that can be attracted by the magnetic member 35.

In assembly of the motherboard sliding mechanism 100, the restricting member 39 is fixed to an end of the rectangular opening 131 of the sidewall 13. The magnetic member 35 is received in the receiving groove 335 of the assembling member 33, and the assembling member 33 with the magnetic member 35 are engaged in the assembling groove 3151 of the sliding member 31. The sliding member 31 is mounted in the recessed portion 113 with the operation portion 311 received in the rectangular opening 131. A motherboard 200 of the electronic device is mounted on the protrusions 115. The sliding member 31 is rotatably fixed to the bracket 10 via the fastener 37 passing through the through hole 3175 of the sliding member 31 and the fixing hole 116 of the bracket 10. The connecting member 20 passing through the restricting groove 1171 via the unlocking groove 1173 is fixed to the housing of the electronic device.

By rotating the sliding member 31, an end of the shaft member 23 is received in the arcuate sliding groove 3177, and the shaft member 23 can slide along the arcuate sliding groove 3177 until an end of the operation portion 311 with the magnetic member 35 contract the bottom of the rectangular groove 393 to fix the bracket 10 in the housing of the electronic device. The shaft member 23 abuts against an end of the guiding groove 117 away from the unlocking groove 1173, the magnetic member 35 attracts the sliding member 31, and the motherboard sliding mechanism 100 is firmly fixed in the housing of the electronic device.

To take the motherboard 200 out from the housing, the pressing surface 313 is pressed to drive the sliding member 31 to rotate around the fastener 37. At this time, the shaft member 23 moves towards the unlocking groove 1173 and slide along the arcuate sliding groove 3177 until the shaft member 23 slides out of the arcuate sliding groove 3177. The shaft member 23 slides out of the unlocking groove 1173, the connecting portion 317 resists with the bottom of the restricting member 39, and the bracket 10 with the motherboard 200 can be drawn out of the housing of the electronic device.

As the sliding member 31 can attract the bracket 10 and the sliding member 31 can rotate to lock or unlock the connecting member 20 to drive the connecting member 20 to lock or unlock with the bracket 10, the motherboard 200 sliding mechanism 100 with the motherboard 200 can be firmly fixed in the housing of the electronic device or conveniently slid out of the housing of the electronic device.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A motherboard sliding mechanism adapted for removing a motherboard out from a housing of an electronic device, comprising:
a bracket for mounting the motherboard, the bracket comprising a supporting board and a sidewall perpendicularly extending from an edge of the supporting board, the supporting board defining a guiding groove and comprising a supporting surface and a recessed portion defined in the supporting surface adjacent to the sidewall, the bottom of the recessed portion defining a fixing hole adjacent to the sidewall, the guiding groove being adjacent to and apart from the fixing hole, and the fixing hole being between the sidewall and the guiding groove;
a connecting member slidably passing through the guiding groove, and being capable of detachably fixing the bracket to the housing of the electronic device;
a sliding assembly rotatably assembled on the bracket, and detachably connected to the connecting member, wherein the sidewall defines a substantially rectangular opening for assembling the sliding assembly, the sliding assembly is capable of being rotated to lock or unlock the connecting member to drive the connecting member to lock or unlock with the bracket, and the motherboard sliding mechanism with the motherboard are conveniently slid out of the housing of the electronic device or firmly fixed in the housing of the electronic device.

2. The motherboard sliding mechanism of claim 1, wherein the guiding groove comprises a restricting groove and an unlocking groove communicating with the restricting groove at an end of the restricting groove away from the sidewall, the connecting member is capable of sliding along the restricting groove and sliding out of the guiding groove through the unlocking groove.

3. The motherboard sliding mechanism of claim 2, wherein the supporting board further comprises a plurality of protrusions mounted on the supporting surface to fix and support the motherboard.

4. The motherboard sliding mechanism of claim 3, wherein the opening is located adjacent to the fixing hole.

5. The motherboard sliding mechanism of claim 4, wherein the sliding assembly comprises a sliding member, the sliding member comprises an operation portion, the shape of the operation portion corresponds to the shape of the rectangular opening to facilitate the installation of the sliding member on the bracket.

6. The motherboard sliding mechanism of claim 5, wherein the sliding assembly further comprises an assembling member, the operation portion comprises a pressing surface and an assembling surface opposite to the pressing surface, and an end of the assembling surface defines an assembling groove.

7. The motherboard sliding mechanism of claim 6, wherein the sliding assembly further comprises a fastener, the sliding member further comprises a connecting portion perpendicularly extending from the assembling surface, the connecting portion defines a rotating groove and a through hole at the center portion of the bottom of the rotating groove corresponding to the fixing hole, and the sliding member is rotatably fixed to the bracket via the fastener passing through the through hole and the fixing hole.

8. The motherboard sliding mechanism of claim 7, wherein the connecting member comprises a fixing member fixed to the housing of the electronic device and a shaft member sleeved on the fixing member, the shaft member slidably and detachably passes through the guiding groove of the bracket.

9. The motherboard sliding mechanism of claim 8, wherein the connecting portion further defines an arcuate sliding groove at a surface of the connecting portion opposite to the rotating groove, and an end of the shaft member is received in the arcuate sliding groove, and the shaft member is able to slide along the arcuate sliding groove.

10. The motherboard sliding mechanism of claim 9, wherein the sliding assembly further comprises an assembling member and a magnetic member, the assembling member comprises a base plate, a receiving portion extending out from the center portion of the base plate, and a receiving groove axially defined at an end of the receiving portion away from the base plate, and the magnetic member is received in the receiving groove.

11. The motherboard sliding mechanism of claim 10, wherein the assembling member with the magnetic member is engaged in the assembling groove of the sliding member.

12. The motherboard sliding mechanism of claim 11, wherein the sliding assembly further comprises a restricting member fixed to an end of the rectangular opening of the sidewall, and the restricting member is able to attract the magnetic member.

13. A motherboard sliding mechanism adapted for removing a motherboard out from a housing of an electronic device, comprising:

- a bracket for mounting the motherboard, the bracket comprising a supporting board and a sidewall perpendicularly extending from an edge of the supporting board, the supporting board defining a guiding groove, the guiding groove comprising a restricting groove and an unlocking groove communicating with the restricting groove at an end of the restricting groove away from the sidewall;
- a connecting member slidably passing through the guiding groove, and being capable of detachably fixing the bracket to the housing of the electronic device, the connecting member being configured for sliding along the restricting groove and sliding out of the guiding groove through the unlocking groove;
- a sliding assembly rotatably assembled on the bracket, and detachably connected to the connecting member, wherein the sidewall defines a substantially rectangular opening for assembling the sliding assembly, the sliding assembly is capable of being rotated to lock or unlock the connecting member to drive the connecting member to lock or unlock with the bracket, and the motherboard sliding mechanism with the motherboard are conveniently slid out of the housing of the electronic device or firmly fixed in the housing of the electronic device.

\* \* \* \* \*